Dec. 17, 1940.   E. P. GLASCOCK   2,225,108
COMBINATION GARDEN IMPLEMENT
Filed June 26, 1939
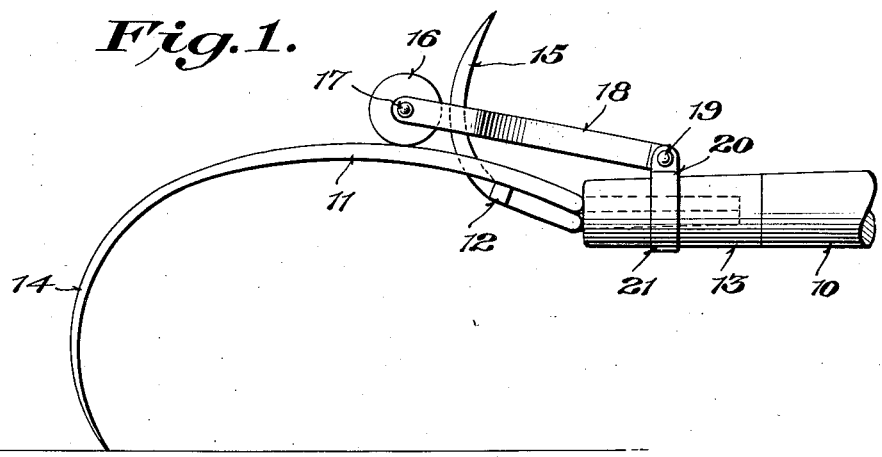
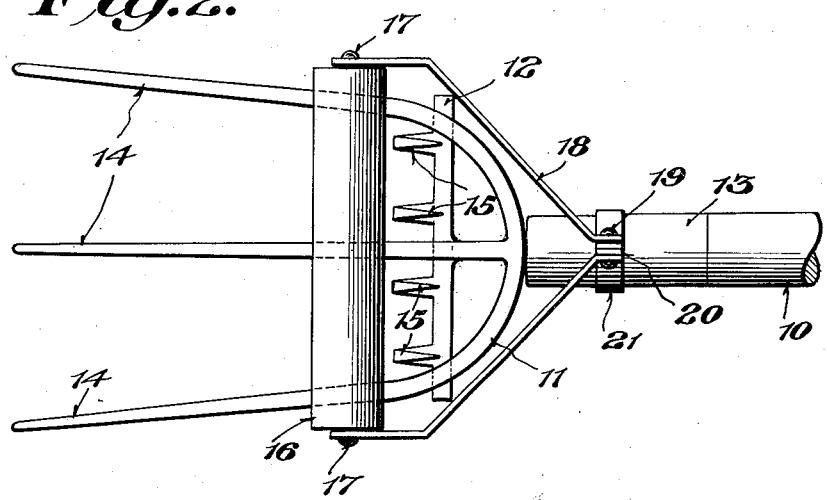
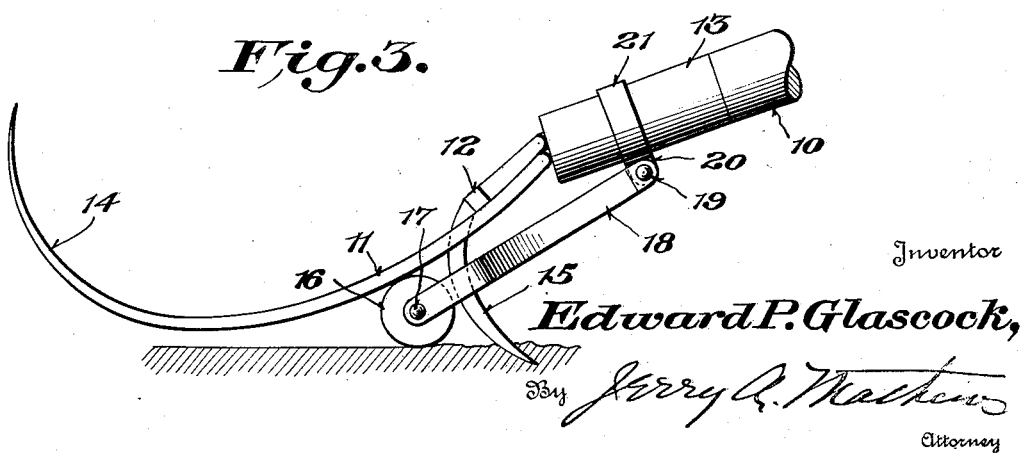
Inventor
Edward P. Glascock,
By Jerry Q. Mathews
Attorney Patented Dec. 17, 1940

2,225,108

UNITED STATES PATENT OFFICE 2,225,108

COMBINATION GARDEN IMPLEMENT

Edward Price Glascock, Monroe City, Mo.

Application June 26, 1939, Serial No. 281,271

2 Claims. (Cl. 97—58)

My invention relates to a combination garden implement primarily intended for earth working, mulching and smoothing the surface of the earth for gardens, and the like.

An object of the invention is to provide a combination implement comprising on one side coarse operating elements such as rake teeth or cultivator hoes for first breaking the ground and on the other side fine operating implement or rake tines for breaking up the coarser clods of earth and together with a ground roller cooperating therewith reduce the earth to a powder or fine mulch which is rolled to a smooth surface during the operation and will conserve moisture.

A further object of the invention is to improve such earth working implements for manual operation and provide such a combination garden tool which will be inexpensive to manufacture and simple and efficient in its operation.

While my garden implement is primarily intended for use in connection with earth working it is not intended that its use shall be limited thereto since employed as a rake it is efficient for both rough and fine raking and rolling for smoothing surfaces of lawns and the like.

Having set forth the nature of my invention, the structure of an embodiment which has proven highly satisfactory will now be described in connection with the accompanying drawing wherein:

Figure 1 is a side elevation of the implement in accordance with my invention.

Figure 2 is a plan view thereof, and

Figure 3 is a side elevation thereof similar to Figure 1 but illustrating the reverse side in cooperation with the ground.

In the several views corresponding parts bear the same characters of reference and in general the handle is designated by the reference numeral 10; this handle is broken away but it will be understood that it is any desired length to suit the individual, six feet having been found a convenient length for pulling the implement backwards and forward for manipulating the ground.

The lower end of handle 10 provides a mounting for the earth working elements 11 and 12 each having a tang extending into the end of the handle 10 and a ferrule 13 secures them therein.

The working element 11 comprises a coarse rake or hoe consisting of relatively long and widely spaced sharply pointed prongs 14 three being shown extending from the base and tang members thereof. These prongs will operate as hoes or cultivators to rip into and open the earth, preferable with greater facility when the ground is wet or moistened. These prongs are also useful for raking in eliminating refuse of a larger variety such as weeds and rubbish as well as for the primary purpose as set forth.

Working element 12 comprises a finer rake member with its teeth or prongs 15 extending from the body portion of this element, four teeth being shown extending between the prongs 14 of element 11 and as shown these teeth are much shorter than prongs 14 and closer spaced. These teeth 15 are preferably sharp pointed and are adapted to break up any clods which there may be after using element 11 and ground has dried sufficiently.

In cooperation with these elements 11 and 12, more particularly the latter, is a roller 16 which as will be noted has a length substantially equal to the width of the prongs of element 11 and substantially greater than the width of element 12. This roller is preferably metallic and is adapted to engage the ground after it has been broken up by the teeth 15 of element 12 so as to roll the loose earth and smooth it gently, packing it so as to conserve moisture in the ground and prevent rapid evaporation.

Roller 16 is mounted for swinging movement when desired and as shown may be journaled at 17 between the ends of arms 18 which are bent to converge toward handle 10 and are pivotally connected at 19 to projection 20 from ferrule 13 which may be in the form of a clamp 21 surrounding and strengthening the ferrule.

The arms 18 which are pivotally connected at 19 to the projection 20 of clamp 21 are of sufficient length to maintain the roller 16 in its cooperating position forward of the teeth 15, as illustrated in Fig. 1. The teeth 15 are slightly yieldable so that the roller 16 may be swung toward the handle free from elements 11 and 12, if it is desired to use the element 12 and teeth 15 as a rake by itself. As will be apparent from Fig. 3, in the position forward of earth working elements 12, the roller 16 cooperates with those elements for smoothing or evening the ground. It will be seen that the position of roller 16 with respect to the teeth of element 12 operates as a gauge as to the depth of penetration of the teeth 15 or the angle of handle 10 may be varied as will be apparent to anyone using the implement. While roller 16 has sufficient weight for functioning as described it is not too heavy for use on a hand tool and when the implement 11 is being used adds a desirable amount of weight thereto for cultivating purposes.

Positioning the elements 11 and 12 as shown also tends to centralize the weight and still permits freedom of operation of these elements independently with respect to each other.

I do not wish to limit myself to any of the specific constructions or modes of operation described above in this specification for purposes of giving examples or illustrations of employment of the invention, for it will be obvious that wide departure from the above may be made without departing from the spirit and scope of my invention, which is as set forth in the following claims.

I claim:

1. In a combination garden implement, the combination of a longitudinal handle member, an earth-working element comprising a coarse rake of relatively long and widely spaced sharply pointed prongs, a second earth working element comprising a rake having reversely turned shorter teeth, a ferrule on the handle to secure said elements thereto, a roller extending crosswise of the two rake elements and immediately forward of the shorter teeth, a pair of arms pivotally connected at one end of each with the ferrule on the handle and having their outer ends provided with bearing means for the roller.

2. In a combination garden implement, the combination of a longitudinal handle member, an earth working element comprising a coarse rake of relatively long and widely spaced prongs, a second earth working element comprising a rake having reversely turned curved teeth, a roller extending crosswise of the two rake elements and immediately forward of the curved teeth, and means pivotally connecting said roller with the handle member, whereby the roller may be swung from a position forward of the teeth to a position adjacent the handle member.

EDWARD PRICE GLASCOCK.